US008688784B2

(12) United States Patent
Zabawskyj et al.

(10) Patent No.: US 8,688,784 B2
(45) Date of Patent: **\*Apr. 1, 2014**

(54) METERING OF TELECOMMUNICATIONS SERVICES

(75) Inventors: Bohdan Zabawskyj, Woodbridge (CA); Philip Steele, Hillsburgh (CA)

(73) Assignee: Redknee Inc., Ontario (CA)

( * ) Notice: Subject to any disclaimer, the term of this patent is extended or adjusted under 35 U.S.C. 154(b) by 491 days.

This patent is subject to a terminal disclaimer.

(21) Appl. No.: 12/922,856

(22) PCT Filed: Mar. 20, 2008
(Under 37 CFR 1.47)

(86) PCT No.: PCT/CA2008/000527
§ 371 (c)(1),
(2), (4) Date: Dec. 8, 2010

(87) PCT Pub. No.: WO2009/114923
PCT Pub. Date: Sep. 24, 2009

(65) Prior Publication Data
US 2011/0264726 A1    Oct. 27, 2011

(51) Int. Cl.
*G06F 15/16*    (2006.01)
(52) U.S. Cl.
USPC ........... 709/205; 709/223; 709/224; 709/225; 709/229
(58) Field of Classification Search
USPC ........................ 709/205, 223, 224, 225, 229
See application file for complete search history.

(56) References Cited

U.S. PATENT DOCUMENTS

| | | | |
|---|---|---|---|
| 8,024,409 B2* | 9/2011 | Wilson | 709/206 |
| 2003/0033398 A1 | 2/2003 | Carlson et al. | |
| 2007/0172040 A1 | 7/2007 | Cesarini et al. | |
| 2007/0281699 A1* | 12/2007 | Rasanen | 455/436 |
| 2008/0065730 A1* | 3/2008 | Wilson | 709/206 |
| 2008/0154828 A1* | 6/2008 | Antebi et al. | 706/46 |
| 2008/0229385 A1* | 9/2008 | Feder et al. | 726/1 |
| 2008/0256251 A1* | 10/2008 | Huotari et al. | 709/229 |
| 2011/0264726 A1* | 10/2011 | Zabawskyj et al. | 709/203 |
| 2012/0101952 A1* | 4/2012 | Raleigh et al. | 705/304 |

FOREIGN PATENT DOCUMENTS

| | | |
|---|---|---|
| WO | 01/54406 A1 | 7/2001 |
| WO | 2004/034640 A2 | 4/2004 |
| WO | 2008/025157 A1 | 3/2008 |

OTHER PUBLICATIONS

Official Communication issued in corresponding European Patent Application No. 08733631.9, mailed on Jul. 14, 2011.
Taylor, "Tallying Tomorrow's WAN Tariffs Today," Data Communications, vol. 25, No. 4, Mar. 21, 1996, pp. 32 and 34.
Official Communication issued in corresponding European Patent Application No. 08733631.9, mailed on Jun. 26, 2012.
Official Communication issued in International Patent Application No. PCT/CA2008/000527, mailed on Dec. 10, 2008.
Official Communication issued in corresponding International Application PCT/CA2008/000527, mailed on May 20, 2010.
"3rd Generation Partnership Project; Technical Specification Group Services and System Aspects; Policy and charging control architecture", (Release 8), Dec. 2007, pp. 1-74.

* cited by examiner

*Primary Examiner* — Liangche A Wang
(74) *Attorney, Agent, or Firm* — Keating & Bennett, LLP

(57) ABSTRACT

A configurator is provided that connects with various disparate elements in a telecommunication system. The configurator is adapted to receive a traffic plan that has a plurality of different aspects that are implemented across the disparate elements. The configurator is adapted to generate processing schemas and/or databases that can be used by the disparate elements in order to implement the traffic plan.

28 Claims, 9 Drawing Sheets

METERING OF TELECOMMUNICATIONS SERVICES

FIELD

The present specification relates generally to telecommunications and more particularly relates to metering of telecommunication services.

BACKGROUND

Hardware advances in computing devices and the networks which interconnect those devices has facilitated an explosion in software applications. Applications such as real-time chat, voice and video are increasingly commonplace and widespread. Voice over Internet Protocol ("VOIP") telephony allows real-time duplex voice communications to be carried over traditional data channels, potentially obviating the need for traditional voice channels, without the latency or jitter normally associated with the specifications of such data channels.

While somewhat behind wireline networks, wireless networks are also increasing in bandwidth to allow substantially real-time chat, voice and video applications to be carried thereover. Likewise, the processing power of handheld portable devices such as cellular telephones and wireless personal digital assistants can now accommodate such applications.

Traditional revenue sources for wireline and wireless networks include voice telephony and traditional data communications. However, the above-mentioned advances are confusing the means by which network operators are compensated by consumers. For example, traditional voice channels were configured to be carried over twisted pair copper telephone wires, yet, technology advances now permit high speed Internet communications to be carried over twisted pair. Still further advances now permit voice communications to be carried over those Internet connections. As a result, the subscriber may eschew the underlying voice service in favour of the Internet service which now serves to provide both voice and traditional data connectivity for the subscriber. This erodes the underlying revenue base for the wireline carrier, whose business model may depend on charging separate fees for both voice and traditional data services. Hardware advances now raise the same possibility of erosion of revenue sources for wireless carriers, which originally offered only wireless voice connectivity but are increasing offering both voice and data connectivity. However the subscriber may be able to find applications to carry the voice service over the data link and thereby avoid charges for voice services.

The preceding examples are the tip of the iceberg. Applications such as Skype, Google Maps, You Tube, file sharing services were unforeseen applications that can radically alter the bandwidth profiles for each subscriber, with deleterious effects on bandwidth and quality-of-service allocations which did not anticipate these services. The result can be a serious deterioration of quality of service for some subscribers as other subscribers unfairly monopolize all available bandwidth.

To address the foregoing, it is increasingly becoming known to monitor wireless traffic so that it can be classified and further processed according to classification, such further processing including the possibility of blocking the traffic and/or to apply different rates of charge according to classification. However, current network infrastructures can still be improved. Indeed, one problem is that, even within the current 3GPP or 3GPP2 specifications for different telecommunication elements, it can readily arise that configurations for those elements within one carrier infrastructure are handled in a disparate manner.

SUMMARY

From one perspective, the present specification provides a configurator that connects with various disparate elements in a telecommunication system. The configurator is adapted to receive a traffic plan that has a plurality of different aspects that are implemented across the disparate elements. Exemplary aspects include policy aspects and charging aspects. Such a traffic plan can include tariffs, rating rules, pricing, bandwidth, priorities, allow/block indicators, bundling details and can include other controls that pertain to the behavior of a subscriber's use of an application, content, or service. The configurator is adapted to generate processing schemas and/or databases that can be used by the disparate elements in order to implement the traffic plan.

From another perspective, the present specification provides a method for metering telecommunication services. The method comprises receiving a plurality of variable inputs at a subscriber terminal. Each of inputs represent a different metering level for a different application, content, or service. The method also comprises generating a traffic plan based on each metering level. The generated traffic plan can be provided to the configurator or to a similar type component so that telecommunication services can be delivered according to the traffic plan. The method also comprises generating a representation of the traffic plan at the subscriber terminal.

DETAILED DESCRIPTION OF THE EMBODIMENTS

Figure 1:
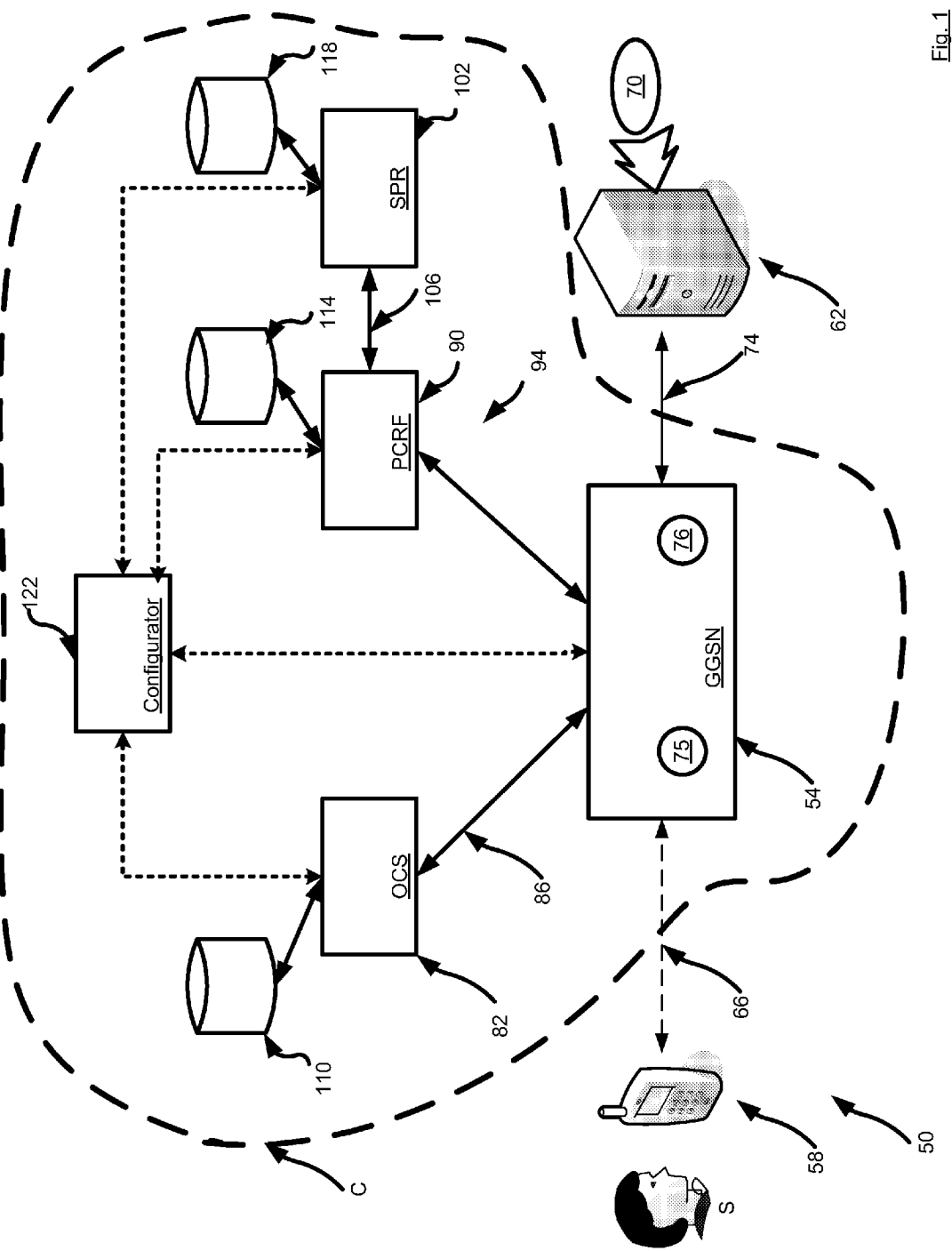
FIG. 1 is a schematic representation of a communication system.

The following definitions relate to telecommunication structures referenced in this specification:

"3GPP Standards" means the Technical Specifications as have been produced by the 3rd Generation Partnership Project (3GPP) as updated from time to time.

"3GPP2 Standards" means the Technical Specifications as have been produced by the 3rd Generation Partnership Project 2 (3GPP2) as updated from time to time.

"AAA" means Authentication, Authorization and Accounting

"AF" means Application Function as described in 3GPP TS 23.203—"3rd Generation Partnership Project; Technical Specification Group Services and System Aspects; Policy and charging control architecture" as updated from time to time "AS" means Application Server "CDR" means Call Detail Record "DIAMETER protocol" means the computer networking protocol for AAA that is a successor to RADIUS as generally described by IETF RFC 3588—"Diameter Base Protocol" as updated from time to time "DPI" means Deep Packet Inspection "GGSN" means GPRS Gateway Service Node as described in 3GPP TS 23.203—"3rd Generation Partnership Project; Technical Specification Group Services and System Aspects; Policy and charging control architecture" as updated from time to time "Gx" means the link and protocol that resides between the PCEF and the PCRF as generally described in 3GPP TS 23.203—"3rd Generation Partnership Project; Technical Specification Group Services and System Aspects; Policy and charging control architecture" as updated from time to time "Gy" means the link and protocol that resides between the OCS and the PCEF as generally described in 3GPP TS 23.203—"3rd Generation Partnership Project; Technical Specification Group Services and System Aspects; Policy and charging control architecture" as updated from time to time "GPRS" means General Packet Radio Service "IETF" means Internet Engineering Task Force "IMS" means IP Multimedia Subsystem as described in 3GPP TS 23.228—"3rd Generation Partnership Project; Technical Specification Group Services and System Aspects; IP Multimedia Subsystem (IMS); Stage 2" as updated from time to time.

"IP" means Internet Protocol

"ISDN" means Integrated Services Digital Network

"MSISDN" means Mobile Subscriber ISDN Number

"OCS" means Online Charging Server as described in 3GPP TS 23.203—"3rd Generation Partnership Project; Technical Specification Group Services and System Aspects; Policy and charging control architecture" as updated from time to time "PCC" means Policy and Charging Control as described in 3GPP TS 23.228—"3rd Generation Partnership Project; Technical Specification Group Services and System Aspects; IP Multimedia Subsystem (IMS); Stage 2" as updated from time to time "PCEF" means Policy Charging Enforcement Function as described in 3GPP TS 23.203—"3rd Generation Partnership Project; Technical Specification Group Services and System Aspects; Policy and charging control architecture" as updated from time to time "PCRF" means Policy Charging Rules Function as described in 3GPP TS 23.203—"3rd Generation Partnership Project; Technical Specification Group Services and System Aspects; Policy and charging control architecture" as updated from time to time.

"P-CSCF" means Proxy Call Session Control Function as described in 3GPP TS 23.228—"3rd Generation Partnership Project; Technical Specification Group Services and System Aspects; IP Multimedia Subsystem (IMS); Stage 2" as updated from time to time "RADIUS" means Remote Authentication Dial In User Service "RAT type" means Radio Access Technology type "Rx" means the link and protocol that resides between the AF and the PCRF as generally described in 3GPP TS 23.203—"3rd Generation Partnership Project; Technical Specification Group Services and System Aspects; Policy and charging control architecture" as updated from time to time "RFC" means Request for Comments "SIP" means Session Initiation Protocol "SCP" means Service Control Point "SPR" means Subscription Profile Repository as generally described in 3GPP TS 23.203—"3rd Generation Partnership Project; Technical Specification Group Services and System Aspects; Policy and charging control architecture" as updated from time to time "SIP" identity means canonical SIP Uniform Resource Identifier employed to reach a user or device (such as 'sip:alice@atlanta.com)'

"SUB ID" means any unique SUB IDentifier. SUB ID can be, for example, a MSISDN or a SIP identity.

Referring now to FIG. 1, a communication system is indicated generally at 50. System 50 comprises a GGSN 54 operated by a carrier C. GGSN 54 interconnects a wireless client device 58 operated by a subscriber S and a server 62. GGSN 54 is based on known GGSN infrastructures, with novel modifications thereto as will be discussed further below. Those skilled in the art will recognize that the GGSN 54 may be manifested as other network elements in the context of other access technologies. For example, a packet serving data node (PDSN) for a code division multiple access (CDMA) based network; the IP edge router for a European Telecommunications Standards Institute (ETSI) based network; the cable Modem termination system (CMTS) for a PacketCable based network; a access service network (ASN) gateway for a WiMax based network; or a deep-packet inspection node for a generic internet protocol based network.

Wireless client device 58 is associated with a subscriber S and can be based on any known or future-conceived mobile or nomadic communication equipment including, for example, a cellular telephone or a wireless personal digital assistant. While not shown herein, it will understood by those skilled in the art that the wireless client device 58 includes a hardware configuration that may comprise one or more input devices in the form of a keyboard, microphone and the like; one or more output devices in the form of a display, a speaker and the like; a radio for conducting wireless communications; all of which are interconnected by a microcomputer comprised of one or more central processing units that itself is connected to volatile memory and non-volatile memory.

Wireless client device 58 connects to GGSN 54 via a first link 66. First link 66 is based on any combination of wireless and wired infrastructures that are now-known, or future-conceived, that can connect wireless client device 58 with GGSN 54. For example, first link 66 can conform with a 3GPP infrastructure that includes a wireless base station that communicates wirelessly with the radio in client device 58, backhaul such as a T1, a mobile switching center, routers and the like.

Server 62 can be based on any known or future-conceived servers, including for example, a web server or any other type of server capable of hosting a service 70 on behalf of client device 58 and for use by subscriber S. Any type of service 70 is contemplated including applications. Examples of services include, but are not limited to, software downloads, webpages, instant messaging, email, web-mail, mapping services, location applications, social networking services and applications, file sharing services and applications, peer-to-peer services, music or video streams or downloads. Thus, it should be understood that server 62 can be any other computing device to which client device 58 may communicate, including another client device, and thus service 70 can also include peer-to-peer type applications including voice over IP, and file sharing. While not shown herein, it will understood by those skilled in the art the server 62 includes a hardware configuration that may comprise one or more input devices in the form of a keyboard, a mouse and the like; one more output devices in the form of a display, and the like; a network interface for conducting network communications; all of which are interconnected by a microcomputer comprised of one or more central processing units that itself is connected to volatile memory and non-volatile memory.

Server 62 connects to GGSN 54 via a second link 74. Second link 74 is based on any combination of wireless or wired infrastructures that are now-known, or future-conceived, that can connect server 62 with GGSN 54. For example, second link 74 can include a 3GPP infrastructure associated with GGSN 54 that includes a gateway to a local area network or wide area network that in turn uses a data protocol such as the IP. Likewise, second link 74 can include relevant portions of the Internet associated with server 62, which connects to the network interface in server 62.

GGSN 54 itself can be based on any known or future-conceived servers having a hardware structure that is generally consistent with the hardware structure discussed in relation to server 62 except including the appropriate interfaces to connect to link 66 and link 74 and (other links as discussed below as shown in FIG. 1), as well as including software that configures the server to fulfill the function of a GGSN as prescribed by the relevant 3GPP standards. GGSN 54 is configured to implement a DPI engine 75. Those skilled in the art will recognize that the methods of identifying and classifying distinct subscriber and application specific bearer flows are collectively referred to as 'Deep Packet Inspection' capabilities. With respect to parametric information that is inherent in the bearer data flow that can be used to identify and classify subscriber or application specific data flows, this may include the source and destination internet protocol addresses, port information, protocol information, and other information that conveys the access technology used (such as the Radio Access Technology parameter). Information that may be conveyed between the device 58 and the server 62 may include the application identifier, flow identifiers, and the media type(s) associated with a given service or application. In addition to the utilization of explicit addressing or application information inherent in the data flow or conveyed from external network elements or application servers, the DPI engine 75 may recognize patterns or characteristic traffic flows as indicative 'signatures' that are associated with a given service or application. GGSN 54 is also configured to implement a PCEF 76 as will be discussed further below. In a present embodiment, DPI engine 75 and PCEF 76 are implemented as software processes on GGSN 54, although it is to be understood that they can be implemented on one or more separate pieces of hardware functionally connected to GGSN 54.

GGSN 54 also connects to an OCS 82 via a third link 86. OCS 82 itself can be based on any known or future-conceived servers having a hardware structure that is generally consistent with the hardware structure discussed in relation server to 62 except including the appropriate interfaces to connect to link 86, as well as including software that configures the server to fulfill the function of an OCS as prescribed in the 3GPP standards OCS 82 is configured to fulfill charging functions in relation to the subscriber account associated with subscriber S (such as maintaining records in association with the MSISDN of device 58) in at least one of a post-paid and a pre-paid context. In the post-paid context OCS 82 is thus configured to generate CDRs that can be used to add charges to the bill or account of a subscriber. In the pre-paid context OCS 82 is thus configured to fulfill the functions of an SCP (and in fact OCS 82 can be implemented as an SCP) that can be used to deduct amounts from a subscriber's prepaid balance. Regardless of the post-paid or pre-paid context, in a present exemplary embodiment OCS 82 is configured to perform such charging in a substantially real-time manner, whereby as the service is being delivered to subscriber S, the charges associated with that service are being applied. Third link 86 can be based on any physical infrastructure that is suitable for connecting GGSN 54 to OCS 82 as will now occur to those of skill in the art. For example, third link 86 can be configured to carrying communications using the Gy protocol. Those skilled in the art will now recognize that the Gy protocol may be manifested as other protocols in the context of other access technologies. For example, where the analogous protocol for a code division multiple access (CDMA) based network is generally described in 3GPP2 X.S0013—"All-IP Core Network Multimedia Domain" as amended from time to time and where the analogous protocol for an internet protocol access technology is generally described in ETSI ES 282 003: "Telecommunications and Internet converged Services and Protocols for Advanced Networking (TISPAN); Resource and Admission Control Sub-system (RACS) Functional Architecture" as amended from time to time.

GGSN 54 also connects to a PCRF 90 via a fourth link 94. PCRF 90 itself can be based on any known or future-conceived servers having a hardware structure that is generally consistent with the hardware structure discussed in relation server to 62 except including the appropriate interfaces to connect to link 94 as well as including software that configures the server to fulfill the function of a PCRF as prescribed in the 3GPP standards. PCRF 90 is configured to fulfill tariff decision, bandwidth quality decision and traffic gating decision (collectively the traffic plan decision) functions which in turn can be used by PCEF 76 within GGSN 54 and eventually by OCS 82 in order to determine the actual charge. PCRF 90 is thus configured to decide traffic policies between device 58 and server 62, including, but not limited to, traffic associated with the access of service 70 on device 58. Indeed PCRF 90 is configured to decide traffic policies on all traffic types carried by GGSN 54. PCRF 90 is also configured to perform such traffic plan decision in substantially real time in order to coordinate with the real time functionality of OCS 82.

Fourth link 94 can be based on any physical infrastructure that is suitable for connecting GGSN 54 to PCRF 90. In a present embodiment fourth link 94 is configured to communications using the Gx protocol. In a more general embodiment, fourth link 94 is configured to carry communications relative to the final determination of an actual traffic plan decision for a given traffic that is being carried between device 58 and server 62.

Those skilled in the art will now recognize that the various protocols discussed herein may be manifested as other protocols in the context of other access technologies. For example, where the analogous protocols for a code division multiple access (CDMA) based network are generally described in 3GPP2 X.S0013—"All-IP Core Network Multimedia Domain" as amended from time to time and where the analogous protocols for an internet protocol access technology are generally described in ETSI ES 282 003: "Telecommunications and Internet converged Services and Protocols for Advanced Networking (TISPAN); Resource and Admission Control Sub-system (RACS) Functional Architecture" as amended from time to time.

PCRF 90 also connects to SPR 102 via fifth link 106. SPR 102 can be implemented as a file server which includes a microcomputer, a network interface and persistent storage in order to maintain data and in order to allow that data to be accessed by PCRF 90 and any other network element that connects to SPR 102. The data that SPR 102 is configured to maintain includes profile information about subscriber S. Such profile information can include, but need not be limited to, an identification of subscriber S (including for example the MSISDN of device 58), whether subscriber S is a prepaid or postpaid subscriber, the various types of traffic that subscriber S is permitted to received on device 58, the various rates for any traffic that subscriber S accesses on device 58, including rates for traffic associated with the accessing of service 70 on device 58, subscriber preferences such as a preferred quality of service to be associated with accessing a given service 70 via device 58, and subscriber or network operator imposed limitations such as an upper bound on the total bandwidth consumed by subscriber S via device 58.

Fifth link 106 can be based on any desired physical link and protocol in order to communicate subscriber profile data to PCRF 90. It should now be apparent that SPR 102 can be implemented within PCRF 90, or it can be situated remotely from PCRF 90 so that a plurality of different PCRFs (not shown) and other network elements can centrally access profile data relative to subscriber 102.

System 50 also comprises a plurality of storage devices 110, 114 and 118. As can be seen in FIG. 1, storage device 110 is connected to OCS 82 and is therefore configured to maintain data usable by OCS 82 to permit OCS 82 to fulfill its functions. Likewise, storage device 114 is connected to PCRF 90 and is therefore configured to maintain data usable by PCRF 90 to permit PCRF 90 to fulfill its functions. Likewise, storage device 118 is connected to SPR 102 and is therefore configured to maintain data usable by SPR 102 to permit SPR 102 to fulfill its functions. It should now be apparent that each storage device 110, 114 and 118 can be implemented, if desired, as a component within its respective component.

It can also be noted at this point that storage devices 110, 114 and 118 each maintain using different data structures, and that some of those data structures can be common amongst all storage devices 110, 114 and 118, while some of those data structures can be disparate amongst all storage devices 110, 114 and 118. The common data structures can arise because aspects of those storage devices are constrained by the requirements 3GPP Standards. The fact The different data structures can arise because aspects of those storage devices will be constrained by unique specifications of the carrier C that defines the domain in which GGSN 54, PCRF 90, OCS 82 and SPR 102 are operated. Alternatively, or additionally, the fact that different specifications for data structures have arisen can result from the fact that GGSN 54, PCRF 90, OCS 82 and SPR 102 may themselves be designed according to different specifications (e.g. one or more of GGSN 54, PCRF 90, OCS 82 and SPR 102 may be provided by different originating equipment manufacturers each with their own unique "flavor" or variation.) Alternatively, or additionally, the fact that different specifications for data structures have arisen can result from the fact that GGSN 54, PCRF 90, OCS 82 and SPR 102 may have been deployed at different times and according to different programs and therefore the data structures associated therewith have been specified differently.

Notwithstanding the specific examples above, it should now be understood that in general each storage device 110, 114, and 118 needs to maintain data that is consistent with the other storage devices 110, 114 and 118; but each storage device 110, 114 and 118 can also have extra data that is not found at the other storage devices 110, 114 and 118. Therefore, all storage device 110, 114, and 118 have to be synchronized according to the specific configuration detail they each need to hold. (Those skilled in the art will now recognize that in FIG. 1 GGSN 54, PCRF 90, OCS 82, SPR 102 and the associated storage devices 110, 114 and 118 are enclosed within the dashed enclosed area indicated at reference C, which represents the carrier C that operates those components. It should also now be understood however that carrier C is a simplified example and that those skilled in the art will recognize how a variation of system 50 can accommodate the components within carrier C being operated by multiple carriers to accommodate roaming scenarios).

System 50 also comprises a configurator 122 that connects to each of GGSN 54, PCRF 90, OCS 82 and SPR 102. As will be discussed further below, configurator 122 is configured to receive a traffic plan for subscribers and to automatically deploy that plan amongst GGSN 54, PCRF 90, OCS 82 and SPR 102 such that GGSN 54, PCRF 90, OCS 82 and SPR 102 will be configured to implement said traffic plan.

Configurator 122 can be implemented using known computing environments having appropriate network interfaces to connected with GGSN 54, PCRF 90, OCS 82 and SPR 102. Such a computing environment could be based on a commercial server that includes a microprocessor and volatile storage. The volatile storage can be implemented as random access memory ("RAM") and can be used to temporarily store applications and data as they are being used by processor. Configurator 122 also includes read only memory ("ROM") connected to the microprocessor which contains a basic operating system containing rudimentary programming instructions, commonly known as a Basic Input/Output System ("BIOS") that are executable by the microprocessor when configurator 122 is initially powered so that a higher level operating system and applications can be loaded and executed on processor. Collectively, one can view the processor, volatile storage device and ROM as a microcomputer. It should now be apparent that configurator 122 can be based on the structure and functionality of a commercial server such as a Sun Fire X4450 Server from Sun Microsystems Inc., of Palo Alto, USA, but it is to be stressed that this is a purely exemplary server, as configurator 122 could also be based on any type of computing device including from other manufacturers.

Figure 2:
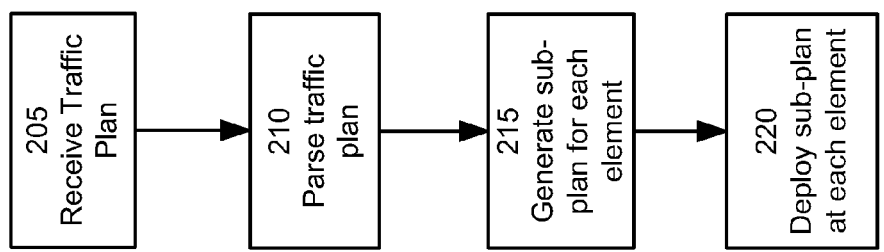
FIG. 2 is a flow-chart depicting a method of configuring a communication system.

Referring now to FIG. 2, a communication method represented in the form of a flow-chart is indicated generally at 200. Method 200 can be implemented using system 50 or functionally equivalent modified versions of system 50. To help provide further understanding relative to method 200 and system 50, method 200 will be discussed in relation to exemplary performance of method 200 using system 50.

At block 205, a traffic plan is received. Block 205 is performed at configurator 122 which can receives a data file representing a traffic plan. The mean by which the plan is received is not particularly limited, and can occur, for example, via a user operating a computer terminal that is connected to configurator 122, whereby the user enters in data via a graphical user interface that represents the traffic plan.

In the present exemplary embodiment the traffic plan is unique to a set of subscribers, including subscriber S, that are associated with traffic plans being offered by carrier C. It should be understood that traffic policies for any number of subscribers S associated with carrier C are contemplated.

The traffic plan includes a plurality of aspects. In a present embodiment, the traffic plan is based on the 3GPP standards and therefore includes charging aspects and policy aspects, where the charging aspects are aspects respective to OCS 82, and the policy aspects are aspects respective to PCRF 90 and SPR 102, and both charging aspects and policy aspects respective to GGSN 54. Table I shows a simplified example of a traffic plan, which includes entries that are unique to subscriber S.

TABLE I

Exemplary contents of Traffic plan

| Entry | Field 1 SUB ID | Field 2 Service | Field 3 Bit Rate | Field 4 Volume | Field 5 Usage Period | Field 6 Billing Arrangement | Field 7 Basic Rate | Field 8 Roaming Rate |
|---|---|---|---|---|---|---|---|---|
| 1 | S | VT1 - VOIP tel 1 | 115 kbps | 100 MB | Day | Postpaid | $10.00/MB | $30.00/MB |
| 2 | S | TC1 - Text chat 1 | 1 kbps | Unlimited | Unlimited | Postpaid | $2.00/MB | $3.00 MB |
| 3 | S | MS1 - Music stream 1 | 25 kbps | 50 songs | Day | Postpaid | $1.00/song | $2.00/song |

Explaining the structure of Table I in greater detail, Field 1 entitled "SUB ID", is an identifier that can be used uniquely identify a subscriber (e.g. subscriber S). The identifier can either be specific to a device (such as device 58), or to each specific subscriber (such as subscriber S) contemplating that each subscriber could authenticate with different computing devices and still be subject to the same traffic plan. (While not discussed herein, where subscribers are permitted to authenticate with different computing devices, then policy P could be further enriched, beyond what is shown in Table I, to vary the policy according to the computing device, or even the nature of links connecting the device to network 58). Field 2 of Table I, entitled "Service" identifies the various types of services that are subject to the traffic plan. As will be explained in greater detail below, services can include any type of service that is currently known or as yet unknown, including voice telephony, chat, video streaming, music streaming and so on. Field 3 of Table I, entitled "Bit Rate" is the maximum permitted bit rate associated with a particular service. Field 4 of Table I, entitled "Volume" is the maximum amount of data that can be downloaded to device 70 and uploaded from device 70. Field 5, of Table I, entitled "Usage Period" defines the period during which the volume defined in Field 4 is measured. That is to say where usage period indicates "Day" and Volume indicates "1 MB", then the subscriber will be permitted one Megabyte of data transfer during one day. Field 6, of Table I, entitled "Excess Permitted" defines whether the subscriber is permitted to exceed the limits defined in Fields 4 and 5. Such excess may be permitted should the subscriber S agree to be subject to increased billing rates, and/or the sacrifice of limits for other services, and/or some other consideration in exchange for being permitted to exceed the limits defined in Fields 4 or 5. Those skilled in the art will recognize that Fields 3, 4, and 5 can be each divided into two separate fields, one for up-stream traffic from device 70 to network 58 and the other for downstream traffic from network 58. Field 6 of Table I, entitled "Billing Arrangement" indicates whether a particular service is on a post paid or prepaid basis. Field 7 entitled "Basic Rate" indicates the rate that is charged for a particular service if that particular subscriber accesses that service from within carrier C's coverage area, and according to the corresponding data in Fields 3, 4 and 5. Field 8 entitled "Roaming Rate" indicates the rate that is charged for a particular service if that subscriber S does not that service from within carrier C's coverage area, but instead within the coverage are of another carrier.

Explaining each exemplary service in greater detail, "VT1—VOIP tel 1" in Field 2, Entry 1 identifies a VOIP telephony service that is offered by a first service provider. For example "VT1—VOIP tel 1" could be the well known VOIP application Skype, available at http://www.skype.com. "TC1—Text chat 1" in Field 2, Entry 2 identifies a "chat" service that is offered by a first service provider. For example "TC1—Text chat 1" could be the well known chat application, Google Talk, available at http://google.com. "MS1—Music stream 1" in Field 2, Entry 3 identifies a streaming audio application that is offered by a first service provider. For example "MS1—Music stream 1" could be based on the well known web-site Pandora, available at http://www.pandora.com. Each of these services will be ascertainable by DPI engine 75 as part of its regular function.

It should now be understood that any type of service can be included in Table I, such as peer-to-peer, video services, mapping services. Also a catchall "unknown" service can also be provided where a particular service is being carried that is not ascertainable by DPI engine 75.

It should now be reemphasized that Table I is a non-limiting example, and one of the features of the specification is the inherent flexibility provided by system 50. Carrier C is able to define any traffic plan that is desired and provide that traffic plan to configurator 122.

At block 210 the traffic plan from block 205 is parsed. As part of this block, configurator 122 will analyze the field structures within Table I and determine which fields are relevant to GGSN 54, PCRF 90, OCS 82 and SPR 102. At a general level, at block 210 configurator will parse the traffic plan according to which portion of the traffic plan is relevant to the policy aspects of the traffic plan, and which port of the traffic plan is relevant to the charging aspects of the traffic plan. Table II shows which fields are applicable to the policy aspects or charging aspects or both.

TABLE II

Fields in Traffic plan Applicable to Different Aspects

| | Field 1 SUB ID | Field 2 Service | Field 3 Bit Rate | Field 4 Volume | Field 5 Usage Period | Field 6 Billing Arrangement | Field 7 Basic Rate | Field 8 Roaming Rate |
|---|---|---|---|---|---|---|---|---|
| Applicable To: | Both policy and | Both policy and | Policy aspect | Both policy and | Policy aspect | Charging Aspect | Charging Aspect | Charging Aspect |

TABLE II-continued

Fields in Traffic plan Applicable to Different Aspects

| Field 1 SUB ID | Field 2 Service | Field 3 Bit Rate | Field 4 Volume | Field 5 Usage Period | Field 6 Billing Arrangement | Field 7 Basic Rate | Field 8 Roaming Rate |
|---|---|---|---|---|---|---|---|
| charging aspects | charging aspects | | charging aspects | | | | |

Moving beyond this general analysis, configurator 122 also maps each field to the appropriate element (e.g. GGSN 54, PCRF 90, OCS 82 and SPR 102). Thus, continuing with the present example Table III.

TABLE III

Fields in Traffic plan Applicable to Different Elements

| Element | Field 1 SUB ID | Field 2 Service | Field 3 Bit Rate | Field 4 Volume | Field 5 Usage Period | Field 6 Billing Arrangement | Field 7 Basic Rate | Field 8 Roaming Rate |
|---|---|---|---|---|---|---|---|---|
| GGSN 54 | Y | Y | Y | Y | Y | N | N | N |
| PCRF 90 | Y | Y | Y | Y | Y | N | N | N |
| SPR 102 | Y | Y | Y | Y | Y | N | N | N |
| OCS 82 | Y | Y | N | Y | N | Y | Y | Y |

Explaining Table III in greater detail, various flags are provided which indicate whether a particular field in Table I are applicable to each of GGSN 54, PCRF 90, OCS 82 and SPR 102. Where a particular field is relevant, then that field will be used as part of creating a sub-plan for that component. For example, Field 1, SUB ID is indicated as being relevant for each of GGSN 54, PCRF 90, OCS 82 and SPR 102 as part of deploying the traffic plan in Table I across GGSN 54, PCRF 90, OCS 82 and SPR 102. However, Field 7 Billing Arrangement is only applicable to OCS 82.

At block 215, a sub-plan for each element is generated. Block 215 is also performed by configurator 122, which generates a sub-plan for each element.

Beginning with the first element in Table III (GGSN 54) configurator 122 can provide a processing schema for use by GGSN 54 in the application of the traffic plan from Table I. Table IV shows an example of a processing schema that can be generated for GGSN 54 as part of block 215

TABLE IV

Processing schema for use by GGSN 54

| SUB ID (Field 1 from Table I) | Service (Field 2 from Table I) | Bit Rate (Field 3 from Table I) | Volume (Field 4 from Table I) | Usage Period (Field 5 from Table I) |
|---|---|---|---|---|
| 1. Obtain SUB ID from device 58 as part of monitoring access to service 70.<br>2. Obtain Service type of service 70 using DPI Engine 75.<br>3. Forward SUB ID and service type to PCRF 90 to obtain bit rate, volume and usage period policy information<br>1. Forward SUB ID and service type to OCS 82 to obtain permission<br>2. If permission granted by OCS 82, permit service 70 applying bit rate, volume and usage period restrictions.<br>3. Record usage of service 70 by SUB ID in view of bit rate, volume and usage periods.<br>4. Forward results or recorded usage to OCS 82. | 1. Obtain bit rate cap as part of policy information from PCRF 90 respective to SUB ID and Service. | 1. Obtain volume cap as part of policy from PCRF 90 respective to SUB ID and Service. | 1. Obtain usage period restrictions as part of policy from PCRF 90 respective to SUB ID and service. | |

Thus, the processing schema in Table IV can be deployed at block 220 to GGSN 54 in order to configure GGSN 54 to operate in accordance with the traffic plan in Table I, such that accessing of service 70 by subscriber S is permitted in accordance with the traffic plan of Table I.

Returning again to block 215, turning now to the second element in Table III (PCRF 90) configurator 122 can provide a processing schema for use by PCRF 90 in the application of the traffic plan from Table I. Table V shows an example of a processing schema that can be generated for PCRF 90 as part of block 215.

TABLE V

Processing schema for use by PCRF 90

| SUB ID (Field 1 from Table I) | Service (Field 2 from Table I) | Bit Rate (Field 3 from Table I) | Volume (Field 4 from Table I) | Usage Period (Field 5 from Table I) |
|---|---|---|---|---|
| 1. Obtain SUB ID from GGSN 54. 2. Obtain Service type from GGSN 54. 3. Access policy information relative to same from SPR 102 | | 1. Obtain bit rate cap as part of policy information from SPR 102 respective to SUB ID and Service. | 1. Obtain volume cap as part of policy from SPR 102 respective to SUB ID and Service. | 1. Obtain usage period restrictions as part of policy from SPR 102 respective to SUB ID and service. |
| 1. Forward bit rate cap, volume cap and usage period restrictions to GGSN 54. | | | | |

Thus, the processing schema in Table V can be deployed at block 220 to PCRF 90 in order to configure PCRF 90 to operate in accordance with the traffic plan in Table I, such that accessing of service 70 by subscriber S is permitted in accordance with the traffic plan of Table I.

Returning again to block 215, turning now to the third element in Table III (SPR 102) configurator 122 can provide a policy and processing schema for use by SPR 102 in the application of the traffic plan from Table I. Table VI shows an example of a policy that can be generated as part of block 215.

TABLE VI

Contents of Policy to be stored at SPR 102

| Entry | Field 1 Subscriber ID | Field 2 Service | Field 3 Bit Rate | Field 4 Volume | Field 5 Usage Period |
|---|---|---|---|---|---|
| 1 | S | VT1 - VOIP tel 1 | 115 kbps | 100 MB | Day |
| 2 | S | TC1 - Text chat 1 | 1 kbps | Unlimited | Unlimited |
| 3 | S | MS1 - Music stream 1 | 25 kbps | 50 songs | Day |

Thus, the database in Table VI can be deployed at block 220 to SPR 102 in order to maintain a policy that reflects the policy aspects of Table I. Table VII shows an example of a processing schema that can be generated for SPR 102 as part of block 215.

TABLE VII

Processing schema for use by SPR 102

| SUB ID (Field 1 from Table I) | Service (Field 2 from Table I) | Bit Rate (Field 3 from Table I) | Volume (Field 4 from Table I) | Usage Period (Field 5 from Table I) |
|---|---|---|---|---|
| 1. Obtain SUB ID from PCRF 90. 2. Obtain Service type from PCRF 90. 3. Access policy information relative to same from Table VI. | | 1. Obtain bit rate cap for subscriber and particular service from Table VI. | 1. Obtain volume cap for subscriber and particular service from Table VI. | 1. Obtain usage period restrictions for subscriber and particular service from Table VI. |
| 1. Forward bit rate cap, volume cap and usage period restrictions to PCRF 90 | | | | |

Thus, the processing schema in Table VII can be deployed at block 220 to SPR 102 in order that SPR 102 processes requests from PCRF 90 in a manner that reflects the policy aspects of Table I.

Returning again to block 215, turning now to the fourth element in Table III (OCS 82) configurator 122 can provide a charging database and a processing schema for use by OCS 82 in the application of the traffic plan from Table I. Table VIII shows an example of a charging database that can be generated for PCRF 90 as part of block 215.

TABLE VIII

Contents of Charging Database to be stored at OCS 82

| Entry | SUB ID (Field 1 from Table I) | Service (Field 2 from Table I) | Billing arrangement (Field 6 from Table I) | Basic Rate (Field 7 from Table I) | Roaming Rate (Field 8 of Table I) |
|---|---|---|---|---|---|
| 1 | S | VT1 - VOIP tel 1 | Postpaid | $10.00/MB | $30.00/MB |
| 2 | S | TC1 - Text chat 1 | Postpaid | $2.00/MB | $3.00 MB |
| 3 | S | MS1 - Music stream 1 | Postpaid | $1.00/song | $2.00/song |

Thus, the database in Table VIII can be deployed at block 220 to OCS 90 in order to maintain a charging database that reflects the charging aspects of Table I. Table IX shows an example of a processing schema that can be generated for OCS 82 as part of block 215.

TABLE IX

Processing schema for use by OCS 82

| SUB ID (Field 1 from Table I) | Service (Field 2 from Table I) | Billing arrangement (Field 6 from Table I) | Basic Rate (Field 7 from Table I) | Roaming Rate (Field 8 of Table I) |
|---|---|---|---|---|
| 1. Obtain SUB ID from GGSN 54. 2. Obtain Service type from GGSN 54. 3. Permit or deny permission to use service based on charging records associated with SUB ID | | 1. Generate billing records according to billing arrangement. For pre-paid arrangements, deduct from pre-paid account. For post-paid arrangement, add total charge to subscriber bill. | 1. Determine if subscriber is using basic rate, and, if so, apply charges based on basic rate. | 1. Determine if subscriber is roaming, and, if so, apply charges based on roaming rate. |

Thus, the processing schema in Table IX can be deployed at block 220 to OCS 82 in order to configure OCS 82 to operate in accordance with the traffic plan in Table I, such that accessing of service 70 by subscriber S is permitted in accordance with the traffic plan of Table I.

When system 50 is configured according to method 200 using Table I, the usage of service 70 by subscriber S will be performed in accordance with the traffic plan of Table I. In operation, assume that service 70 is VT1—VOIP Tel 1. When subscriber S attempts to access service 70, DPI engine 75 within GGSN 54 will inspect the packets forming the request to access service 70, and will ascertain that subscriber S using device 58 is attempting to access service 70. In turn, GGSN 54 will utilize the processing schema of Table IV to access PCRF 90 to obtain policy information relative to the terms of use of service 70 by subscriber S.

In turn, PCRF 90 will utilize the processing schema of Table V in order to ascertain the relevant policy information. In using the processing schema of Table V, PCRF 90 will access SPR 102. SPR 102 will in turn use the processing schema of Table VII and access the policy in Table VI to obtain the relevant policy information for VT1—VOIP tel 1, in order to ascertain a bit-rate cap of 115 kbps with a maximum volume of 100 megabytes per day. SPR 102 will return this policy information to PCRF 90 which will forward that policy information back to GGSN 54. GGSN 54, still utilizing the processing schema in Table IV, will now access OCS 82 which will use its own processing schema from Table IX coupled with the charging database in Table VIII to perform the charging aspect function of the traffic plan of Table I. If OCS 82 instructs that it permits access, GGSN 54 will (continuing to apply the processing schema of Table IV) permit subscriber S to access service 70, sending appropriate charging information back to OCS 82.

Those skilled in the art will now recognize that the traffic plan in Table I has now been implemented using the foregoing teachings, such that accessing of service 70 by subscriber S is permitted in accordance with the traffic plan of Table I. Advantageously, configurator 122 has provided a central location for receiving the traffic plan and automatically configured the various elements of system 50 to implement the traffic plan. This permits carrier C to modify the traffic plan at any time without having to individually update GGSN 54, PCRF 90, SPR 102 and OCS 82 to respond to such modifications.

Those skilled in the art will also recognize that the Configurator can also apply the traffic plan to other network elements including, but limited to, the Mobile Switching Center Service Capability Interaction Manager (SCIM), and the Call Session Control Function (CSCF) as well as value added service platforms such as the Multimedia Messaging Service Center (MMS-C), Application Server, Wireless Application Protocol (WAP) Gateway, Short Message Service Center (SMS-C), Unified Messaging Server, and content (e.g. music or video) distribution servers.

The nature and scope of such service profile criteria information is not particularly limited. For example, traffic plan criteria can include a flag indicating that access of service 70 is not permitted whatsoever by device 58 such that device 58 will be prevented access to service 70. Where access to service 70 is permitted according to the traffic plan criteria, then the traffic plan criteria can include rating information, which can include complex criteria, such as, at least one of: times of day, week or month that access to service 70 is restricted or prevented; tiered rates of charge for accessing service 70 depending on the time of day service 70 is being accessed; maximum bandwidth allocations associated with access to service 70; maximum amounts of data that can be accessed from service 70; tiers of rates associated with higher bandwidths or capacities; tiers of rates associated with whether device 58 is roaming or within its home network; privacy management that anonymizes certain data carried between device 58 and service 70; flat rate charges for unlimited access to service 70; and combinations of any of the foregoing. Other traffic plan criteria will now occur to those of skill in the art. Indeed, traffic plan criteria can be found in the Applicants' co-pending application number PCT/CA2007/001528 and entitled Policy Services, the contents of which are incorporated herein by reference.

While the foregoing describes certain specific embodiments, it is to be reemphasized that those embodiments are exemplary and can be modified and that variations, subsets and combinations of those embodiments are contemplated. Indeed, it is to be reemphasized that the specific examples of processing schemas and databases are simplified for ease of explanation. But it should be understood that the database format of Table I, and the database formats and schema formats of the other Tables can vary according to the specific computing environments used to implement each of the components in system 50, and therefore configurator 122 can in turn be structured to accommodate such specific computing environments. As a still further example, the teachings of PCT/CA2007/001528 can be incorporated into the teachings herein.

Figure 3:
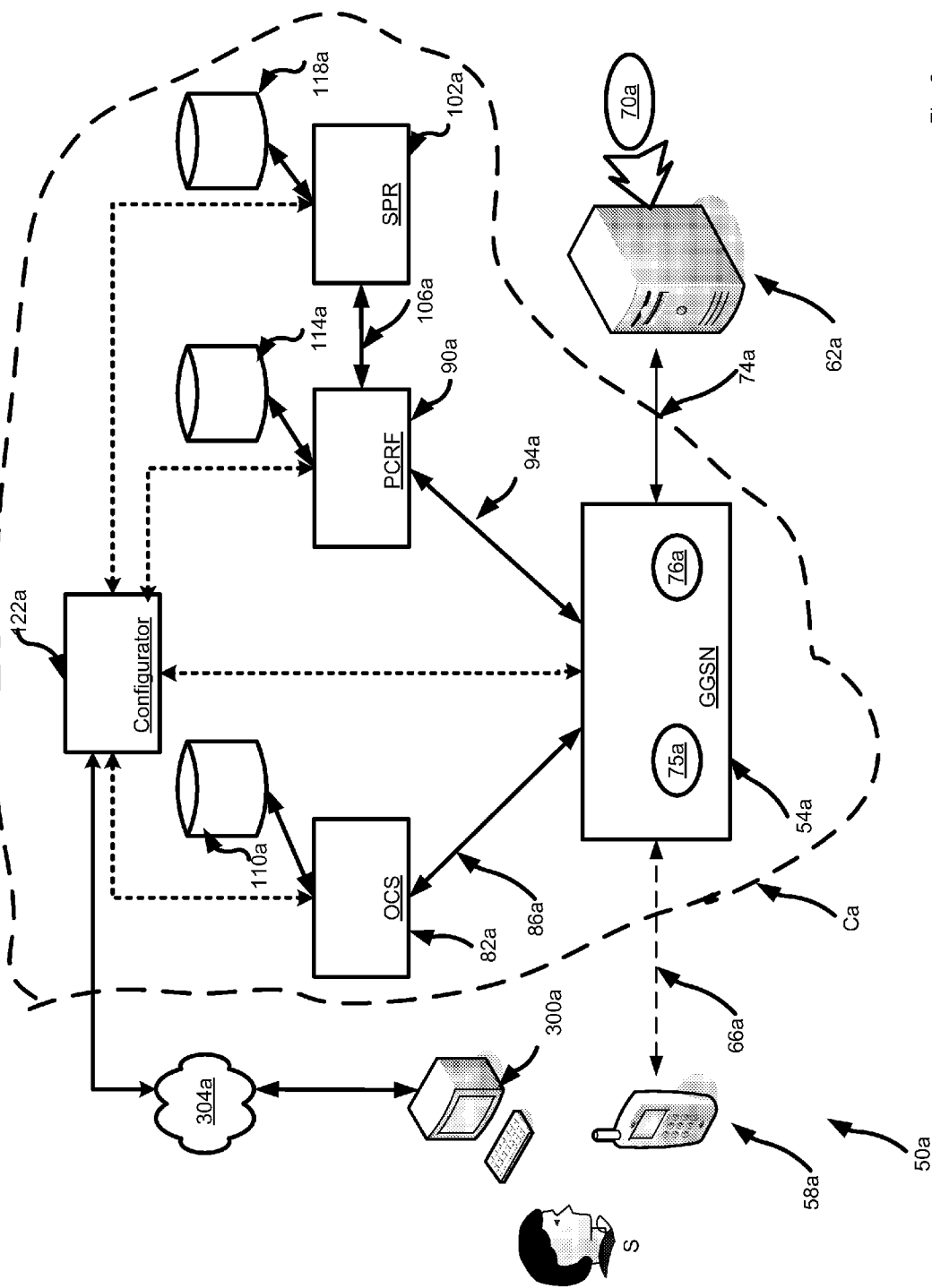
FIG. 3 is a schematic representation of a communication system which is a variation on the system of FIG. 1.

Referring now to FIG. 3, a communication system in accordance with another embodiment is indicated generally at 50a. System 50a is a variation on system 50 and therefore components in system 50a that have like components in system 50 bear the same reference character in both systems, except that in system 50*a* the reference character is followed by the suffix "*a*".

Figure 4:
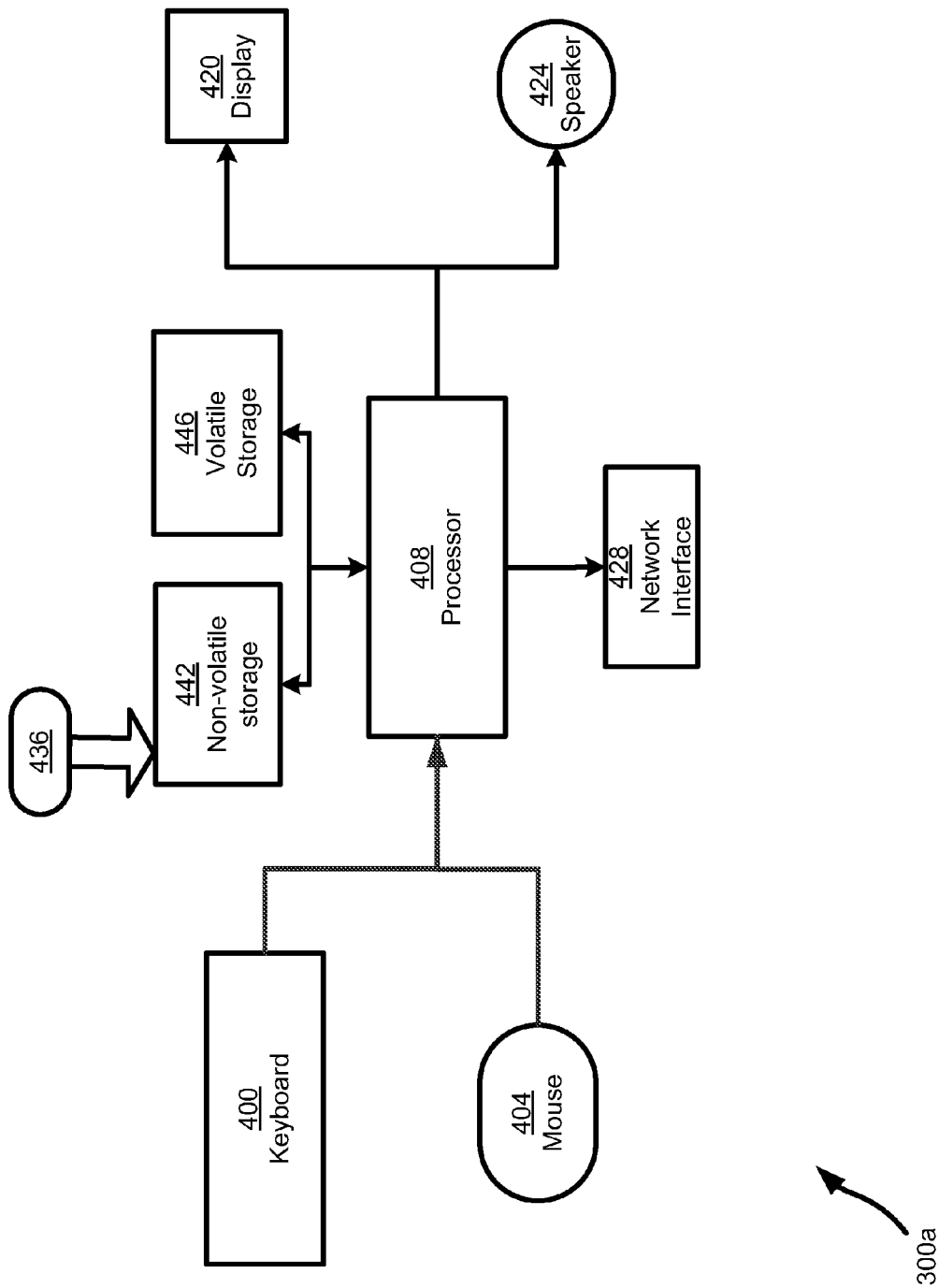
FIG. 4 is a schematic representation of the subscriber terminal of FIG. 3.

Of note is that system 50*a* includes a subscriber terminal 300*a* which connects to configurator 122*a* via a network 304*a*. In a present, purely exemplary, embodiment network 304*a* is the Internet. Subscriber terminal 300*a* is based on the functionality of desktop computing device that includes at least networking capabilities. Many well known desktop computing devices, or variants thereof, are suitable for the present embodiment. Referring now to FIG. 4, a schematic block diagram of each subscriber terminal 300*a* is shown. It should be emphasized that the structure in FIG. 4 is purely exemplary, and contemplates a device that can be used for Internet communications over network 304*a*. Subscriber terminal 300*a* includes a plurality of input devices, which in a present embodiment includes a keyboard 400 and a microphone 404. Other input devices, such as a microphone are also contemplated. Input from keyboard 400 and mouse 404 is received at a processor 408, which in turn communicates with a non-volatile storage unit 442 (e.g. read only memory ("ROM"), Erase Electronic Programmable Read Only Memory ("EEPROM"), Flash Memory) and a volatile storage unit 446 (e.g. random access memory ("RAM")). Programming instructions that implement the functional teachings of subscriber terminal 300*a* as described herein are typically maintained, persistently, in non-volatile storage unit 442 and used by processor 408 which makes appropriate utilization of volatile storage 446 during the execution of such programming instructions. Variants on subscriber terminal 300*a* can include a laptop computer equipped with wireless capabilities. It will become apparent that even device 58*a* can serve the function as subscriber terminal 300*a*, thereby obviating the need for a separate subscriber terminal 300*a*.

Subscriber terminal 300*a* is configured to operate as a web-browser and therefore a web-browser application 436 is maintained in non-volatile storage 442 in order to permit subscriber S to operate subscriber terminal 300*a* and perform web-browsing functions. Also of note in system 50*a* is that configurator 122*a* is configured to operate a web-server to host web-browsing sessions on subscriber terminal 300*a*.

Figure 5:
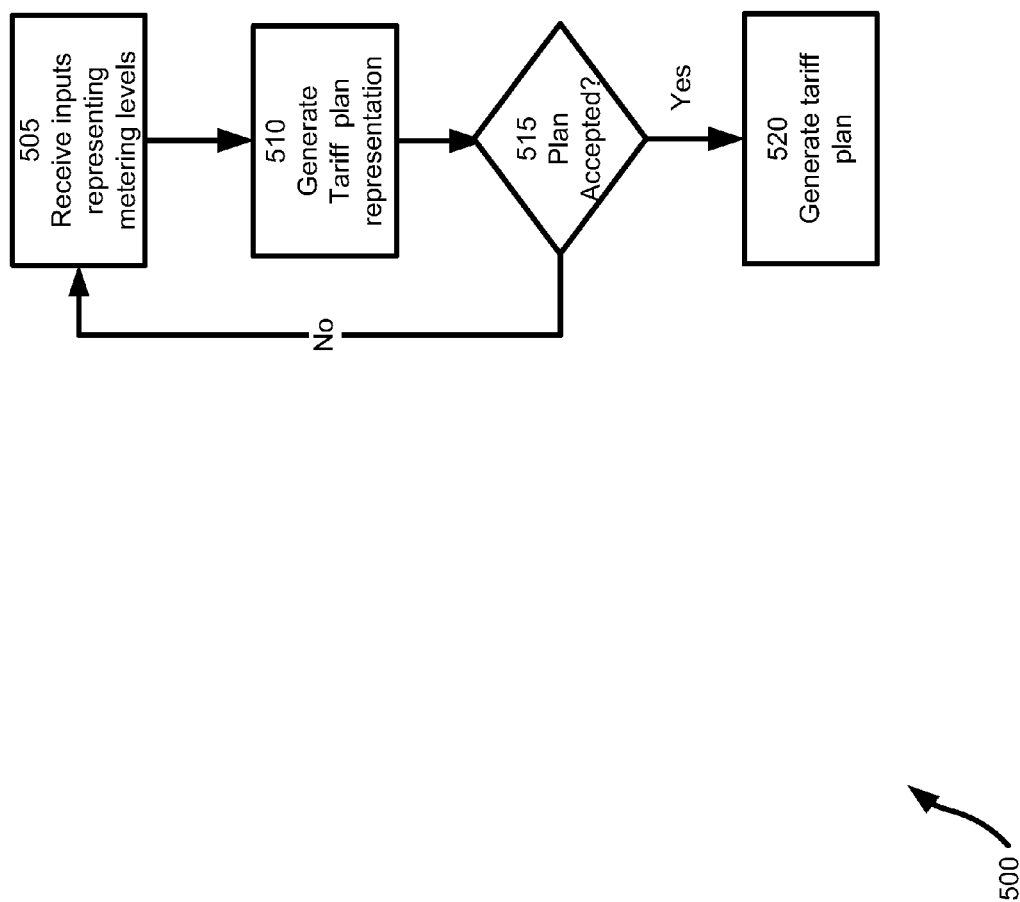
FIG. 5 is a flow-chart depicting a method for metering telecommunication services.

Referring now to FIG. 5, a method for metering of telecommunication services is indicated in the form of a flowchart generally at 500. Method 500 (or variants thereof) can be used, if desired, prior to invocation of method 200 (or a variation thereof), such that the traffic plan referenced at block 520 can be all or part of the traffic plan introduced at block 205.

At block 505, inputs are received representing metering levels. In a present exemplary embodiment, block 505 can be performed by the web-server executing on configurator 122*a* in conjunction with the web-browser application 436 executing on subscriber terminal 300*a*. In other words, a graphical user interface can be generated on subscriber terminal 300*a* which receives inputs from subscriber S that represent metering levels and which are in turn received at the web-server on configurator 122*a*.

Figure 6:
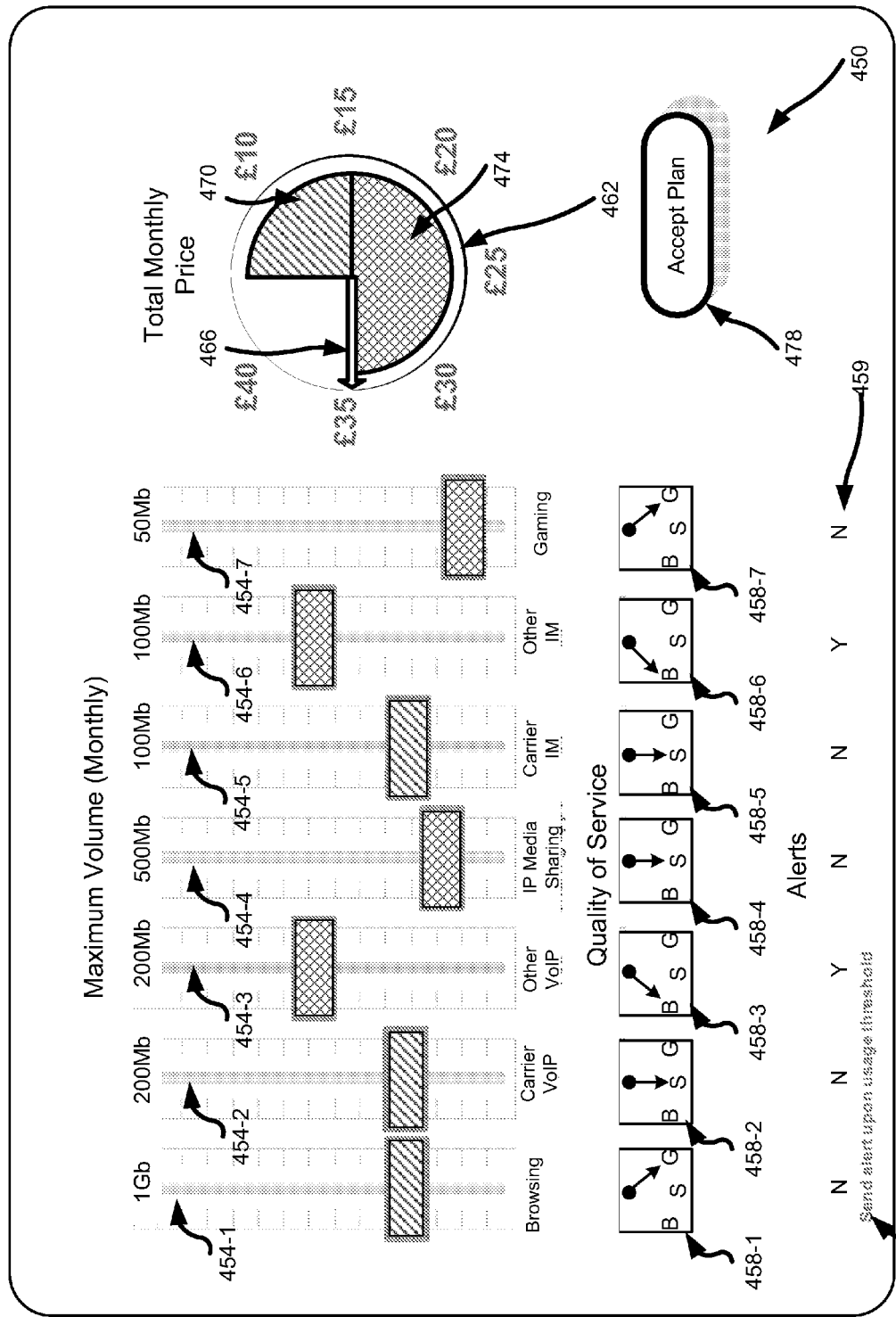
FIG. 6 shows the display of the device of FIG. 4 during part of the performance of the method of FIG. 5.

FIG. 6 shows an example graphical user interface (GUI) 450 that can be hosted by configurator 122*a* for generation on display 420. GUI 450, via processor 408, is responsive to inputs from keyboard 400 and mouse 404. GUI 450 comprises a volume section, a quality of service section, an alert section and a pricing section.

The volume section outlines maximum amounts of data that can be downloaded to device 58*a* and uploaded from device 58*a* for various services. The volume selection is generally analogous in concept to Field 4 of Table I. In general, note that that the metering levels in FIG. 6 do not correspond exactly to the various levels that can form part of a tariff plan as discussed in relation to system 50. This difference is intended illustrate that different types and configurations of tariff plans and the constituent elements thereof are contemplated. The volume section comprises a plurality of sliders 454-1, 454-2, 454-3, 454-4, 454-5, 454-6, 454-7 (collectively, sliders 454 and generically, slider 454. This nomenclature is used elsewhere). Sliders are graphical representations of electro-mechanical rheostats. Each slider 454 is respective to a different service and can be used to select a different maximum amount of data that can be downloaded and/or uploaded in a given month. Slider 454-1 thus can be used to provide input representing maximum amount of data that can be downloaded and/or uploaded in a given month for a web-browsing service. Slider 454-2 thus can be used to provide input representing maximum amount of data (between zero and one Gigabyte) that can be downloaded and/or uploaded in a given month for a VoIP service that is hosted by carrier C. Slider 454-3 thus can be used to provide input representing maximum amount of data (between zero and two-hundred megabytes) that can be downloaded and/or uploaded in a given month for a VoIP service that is hosted by carriers other than carrier C. Slider 454-4 thus can be used to provide input representing maximum amount of data (between zero and five-hundred megabytes) that can be downloaded and/or uploaded in a given month for an IP Media Sharing service (e.g. Bittorrent or other peer to peer file sharing service). Slider 454-5 thus can be used to provide input representing maximum amount of data (between zero and one-hundred megabytes) that can be downloaded and/or uploaded in a given month for an Instant Messaging service hosted by carrier C (e.g. Bittorrent or other peer to peer file sharing service). Slider 454-6 thus can be used to provide input representing maximum amount of data (between zero and one-hundred megabytes) that can be downloaded and/or uploaded in a given month for an Instant Messaging service hosted by a carrier other than carrier C (e.g. Bittorrent or other peer to peer file sharing service). Slider 454-7 thus can be used to provide input representing maximum amount of data (between zero and fifty megabytes) that can be downloaded and/or uploaded in a given month for a gaming service (e.g. an online video game such as poker which is played via multiple devices like device 58 which are also connected to carrier C).

It should also be understood that the volume section, can, in other embodiments express different, or additional volume metrics, such as an event count (e.g. number of instant messages), minutes (e.g. maximum number of minutes of VoIP calling). Other volume metrics will now occur to those of skill in the art. Each slider 454 can also be configured to reflect a different volume metric.

Furthermore, as another variation, each slider 454 can be configured to show a representation of the exact amount of volume that is currently selected by that particular slider 454. In this variation, each slider 454 would have a current value depicted in the slider which changes in real time as that slider 454 is slid up and down. The values within each slider 454 can be configured to be editable within the slider itself, so that one can simply enter the text, for example, "50 Mb" instead of having to accurately move it up and down to achieve 50 Mb.

GUI 450 can also be modified, for other embodiments, to have multiple screens, whereby "double-clicking" (or other selecting technique) on a particular slider 454 could invoke another GUI that provides granular detail about a particular service. For example, gaming slider 454-7 could be configured to be selectable so that another GUI is invoked (not shown in the Figures) on screen 420 with an additional set of sliders, and each of those sliders could be configured to reflect individual games, which in their aggregate would be capped by the volume selected according to slider 454-7 on GUI 450. The quality of service section of GUI 450 comprises a plurality of switches 458. Each switch 458 is respective to a slider 454 and the associated service. Switches 458 are, in a present example, graphical representations of 3-way electromechanical switches. Each switch 458 can be set to define a quality of service level for a particular service. In the present example, each switch 458 has three positions, labeled "B" for Bronze; "S" for Silver; and "G" for Gold. Bronze level of service would be the lowest quality of service level, while silver would be an intermediate quality of service level, and gold would be the highest quality of service level. Each quality of service level would generally reflect a maximum bit rate (generally analogous to Field 3 of Table I). Those skilled in the art will recognize that each switch 458 can be manifested via an alternative control (for example, a slider) that provides for a finer degree of granularity in terms of defining the quality of service level for a particular service.

The alert section of GUI 450 comprises a plurality of radio-boxes 459 that simply indicate "Y" for "Yes" or "N" for No. The radio-boxes, when set to "Y" indicate that a message is to be sent to device 58 when device 58 reaches (or nears) the maximum volume indicated in the maximum volume section. GUI 450 can be modified so that alert section also includes a volume metric that indicates the exact volume of consumption which will trigger the delivery of the alert to device 58. The alert section could be modified to be an automatic quality of service adjustment. The identification of a volume metric in the alert section could thus be used (in lieu of or in addition to the actual alert notification) as part of generation of the tariff plan at block 520, whereby a quality of service selection at switch 450 would be automatically dropped to the next lower setting once the selected volume in the alert section is reached, thereby deferring the reaching of the threshold value in exchange for a reduction in quality of service.

Note that GUI 450 can be implemented different combinations of sliders, switches or radio-boxes or other interactive graphics that can be used to provide the input contemplated at block 505 of method 500.

At block 510, a tariff plan representation is generated based on the inputs received at block 505. In a present exemplary embodiment, block 510 is also performed by the web-server executing on configurator 122a in conjunction with the web-browser application 436 executing on subscriber terminal 300a. In a present embodiment, the graphical user interface in FIG. 6 is also used as part of the implementation of block 510, whereby a representation of the tariff plan is generated on subscriber terminal 300a based on determinations made at configurator 122a.

Block 510 is implemented via the pricing section of GUI 450, which comprises a pie-graph 462 that includes a dial-pointer 466 that indicates the total monthly price of a subscription that has a tariff plan that is implemented in accordance with the inputs provided in volume section, quality-of-service section and alert section. Also note, in the present exemplary embodiment, pie-graph 462 has two portions: a basic package portion 470 and an enhanced package portion 474. Basic package portion 470 is filled with hatching, while enhanced package portion 474 is filled with cross-hatching. Such hatching and cross-hatching, it will be appreciated, can be effected with different colours rather than hatching and cross-hatching. Note that the hatching in basic package portion 470 corresponds to hatching on sliders 454-1, 454-2 and 454-5, while the cross-hatching in enhanced package portion 474 corresponds to cross-hatching on sliders 454-3, 454-4, 454-6 and 454-7. Thus, pie-graph 462 indicates which portion of the tariff plan is attributable to basic services (i.e. those services associated with sliders 454-1, 454-2 and 454-5) and which portion of the tariff plan is attributable to enhanced services (i.e. those services associated with sliders 454-3, 454-4, 454-6 and 454-7). It will be appreciated that what is designated "basic services" vs "enhanced services" can be determined by carrier C, and so designated in such a manner to encourage the use of "basic services" vs "enhanced services", or to make clear that additional charges are being levied for "enhanced services" due to the fact that they are more costly for carrier C to implement.

Note that while pie-graph 462 comprises two portions 470 and 474, GUI 450 can be modified to have only one portion or to have more than one portion. For example, pie-graph 462 could be configured to have seven portions, with one portion being respective to each slider 454. Furthermore, pie-graph 462 can be further segmented into further portions, with such additional portions configured to show which portion of the pie-graph 462 is attributable to a particularly quality of service respective to switches 458.

Thus, in a typical scenario, the position of dial-pointer 466 will point to higher prices as any one or more of sliders 454 are raised. Likewise, the position of dial-pointer 466 will point to lower prices as any one or more of sliders 454 are lowered. Also, the position of dial-pointer 466 will point to higher prices as any one or more of switches 458 are increased from a lower quality of service level to a higher quality of service level. Likewise, the position of dial-pointer 466 will point to lower prices as any one or more any one or more of switches 458 are decreased to a lower quality of service level from a higher quality of service level. Pricing can also be changed according to whether or not any of the radio-boxes are selected.

Also of note, is that the size of basic package portion of 470 will increase or decrease according to changes to sliders 458-1, 458-2 and 458-5 or switches 458-1, 458-2, and 458-5, while the size of enhanced package portion of 474 will increase or decrease according to changes to sliders 454-3, 454-4, 454-6 and 454-7 or switches 458-3, 458-4, 458-6 and 458-7.

In another variation, dial-pointer 466 can itself be configured to be selectable and movable, so that selecting and moving dial-pointer 466 towards a lower value can automatically cause corresponding sliders 454 and/or switches 458 to likewise lower. Conversely, moving dial-pointer 466 towards a higher value can automatically cause corresponding sliders 454 and/or switches 458 to likewise raise. As a still further variation, dial-pointer 466 can be configured so that individual sliders 458 and/or switches 458 can be "locked" in a given position, so that moving dial-pointer 466 will only cause corresponding movement in those sliders 458 and/or switches 458 which are not "locked". As a still further variation, dial-pointer 466 can be configured to be "locked", in addition to the ability to "lock" sliders 454 and/or switches 458, so that movement of one unlocked slider 454 or switch 458 will only cause corresponding movement in those sliders 454 or switches 458 that are unlocked.

Referring again to FIG. 5, at block 515 a determination is made as to whether the plan is accepted. In a present embodiment, and referring now to FIG. 6, the determination of whether or not the plan is accepted is based on whether or not a selection button 478 is selected (via for example a selection and click of mouse 404). If selection button 478 is not selected then method 500 cycles back to block 505. If selection button 478 is selected then method 500 advances to block 520.

At block 520, a tariff plan is generated based on the inputs from block 505. The resulting tariff plan can perform the input for block 205 of method 200. At this point, however, it is to be reiterated that the specific services and associated options for the tariff plans that can be selected through the exemplary GUI 450 are not intended to be identical to the exemplary services and associated options for the tariff plans shown in Table I. In fact, each has different examples in order to illustrate the configurability associated with the teachings herein.

Figure 7:
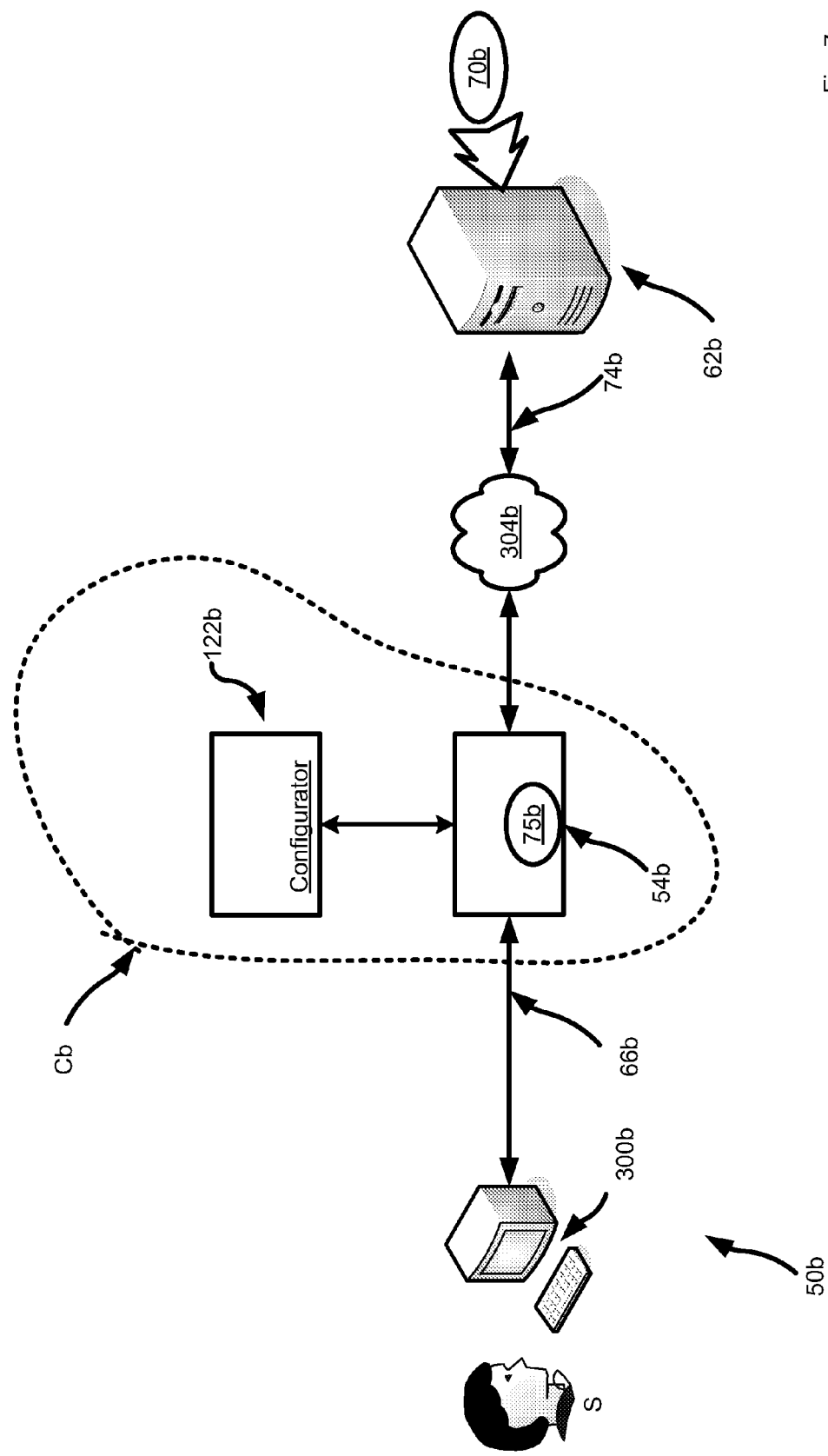
FIG. 7 is a schematic representation of a communication system which is a variation of the system of FIG. 1.

It should now be understood that method 500 need not be limited to system 50a, and that indeed method 500 and GUI 450 can be used to permit subscribers S to provide input representing desired home or business tariff plans for other types of data services, including home or business Internet access through wired services (e.g. T1, T3, Fibre-optic, Community Access TeleVision (CATV) coaxial links, Digital Subscriber Line (DSL)) or wireless services (WiMax, Universal Mobile Telecommunications Service, Enhanced Data Rates for GSM Evolution (EDGE)). Referring now to FIG. 7, an example of another communication system that can be used with method 500 is indicated generally at 50b. System 50b is a variation on system 50a and therefore components in system 50b that have like components in system 50a bear the same reference character in both systems, except that in system 50b the reference character is followed by the suffix "b" instead of "a".

Of note is that system 50b is a much simplified version of system 50a and is based on a wired configuration. Link 66b is based on DSL, CATV, T1 or T3 (though it can be based on a wireless link). Carrier C operates any generic gateway equipment 54b (instead of GGSN 54a or GGSN 54) that can connect link 66b to Internet 304b. Carrier C is an Internet Service Provider for subscriber station 300b. Subscriber station 300b can be used to access Internet 304b, but can also be used to access configurator 122b in order to perform method 500b. Configurator 122b is a simplified abstraction of configurator 122 in that configurator 122b is intended to generically cooperates with gateway equipment 54b to implement the tariff plan, and cooperating in a manner that is complementary to the functionality of gateway equipment 54b. Note that the billing functions of system 50b are omitted for simplified convenience, but that configurator 122b and gateway 54b likewise interact with such billing functions.

As a still further variation, GUI 450 can be modified to include radio-buttons, a drop-down box or other selection means that permits the selection of a number of pre-set tariff plans (not shown). Upon selection of one of the pre-set tariff plans, each slider 454, switch 458, radio-boxes 459, piggraph 462 and dial-pointer 466 will move to a predefined location on GUI 450. In this modified embodiment, a tariff-plan with particular setting can be established with minimal input, or a predefined tariff plan can be tweaked to reflect unique preferences. As an example, a "basic" package and an "enhanced" package could be offered as pre-set plans. In this example, FIG. 6 could reflect the "enhanced" package, while selection of the "basic" package would cause: sliders 454-3, 454-4, 454-6 and 454-7 to drop to zero; dial-pointer 466 to point to the fifteen-pounds marker; and enhanced package portion 474 to disappear.

Figure 8:
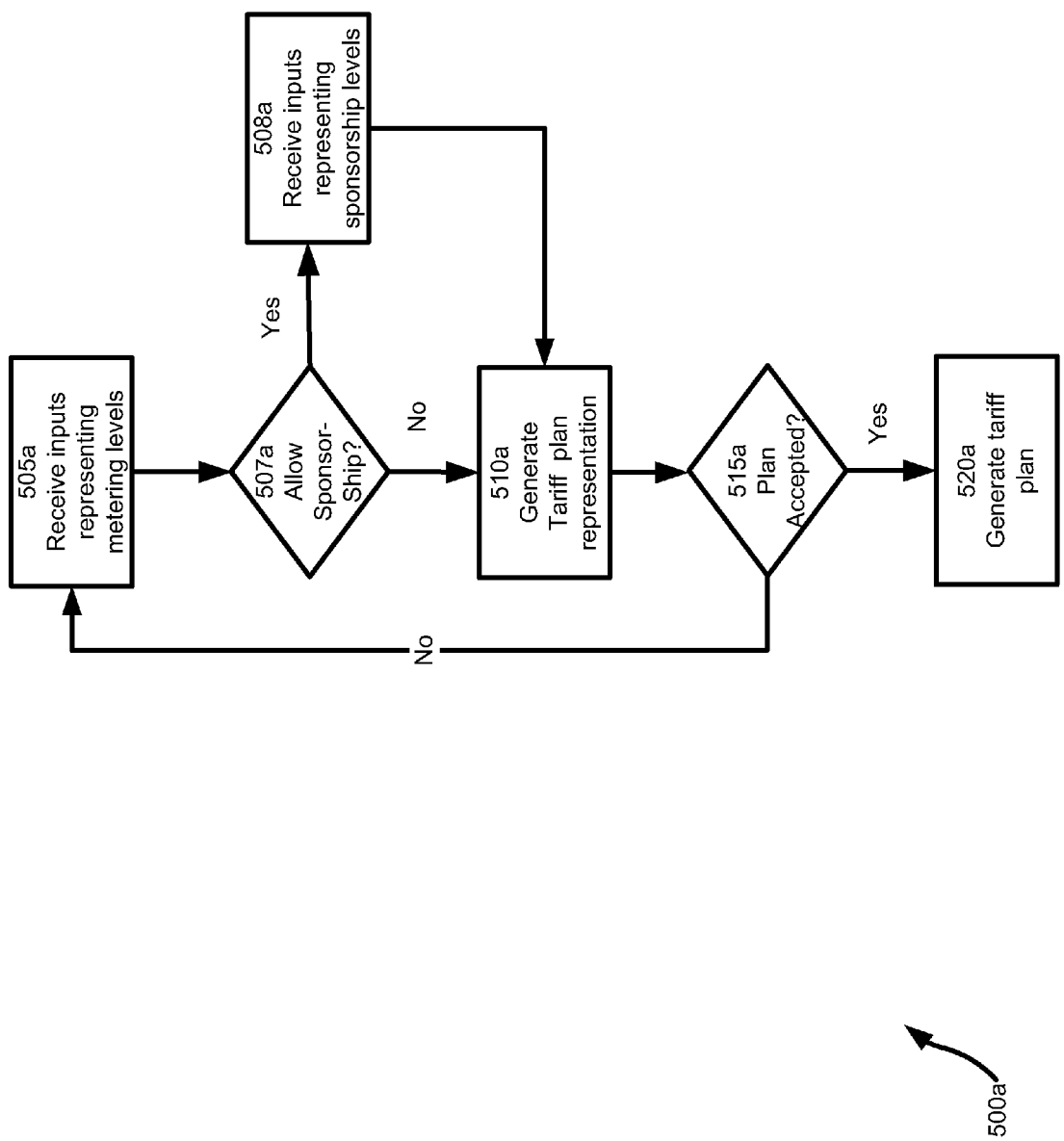
FIG. 8 is a flow-chart depicting a method for metering telecommunication services as a variation on the method of FIG. 5.
Figure 9:
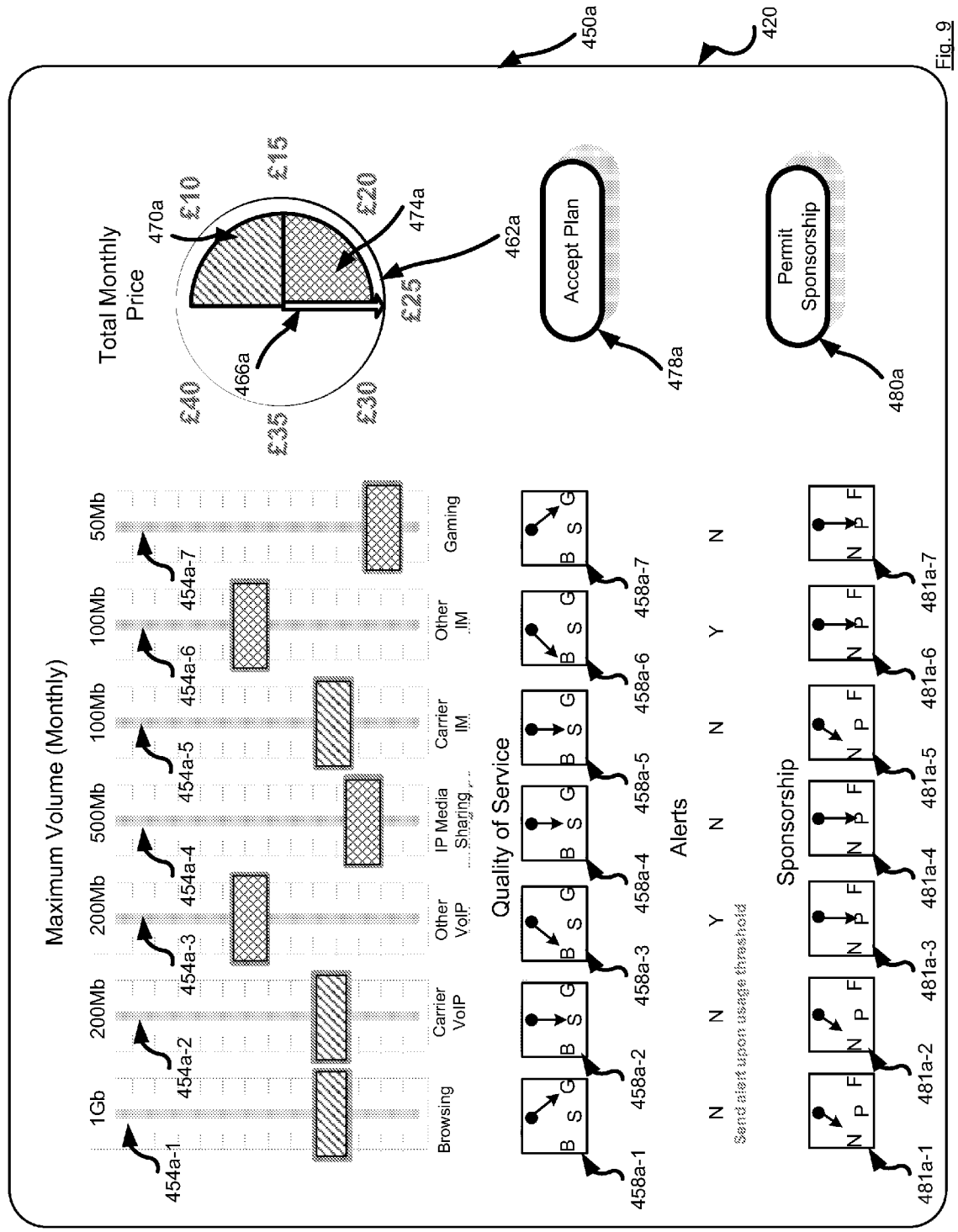
FIG. 9 shows the display of the device of FIG. 4 during part of the performance of the method of FIG. 8.

Still further variations are contemplated. FIG. 8 shows a method for metering of telecommunication services is indicated in the form of a flow-chart generally at 500a, which is a variation on method 500. FIG. 9 shows another example graphical user interface GUI 450a, which is a variation on GUI 450. GUI 450a is configured for use in conjunction with method 500a. Method 500a includes substantially the same blocks as method 500 and thus like blocks bear like references, except followed by the suffix "a". GUI 450a includes substantially the same components as GUI 450 and thus like components bear like references, except followed by the suffix "a". Of note is that method 500a includes two extra blocks: Block 507a is a decision block whereby a determination is made as to whether the tariff plan will allow sponsorships to subsidize the tariff plan; block 508a is arrived at from the "yes" branch of block 507a, whereby inputs are received relative to accepted sponsorship levels. To implement the functionality of block 507a, GUI 450a comprises a permit sponsorship selection button 480a. To implement functionality of block 508a, GUI 450a comprises a sponsorship section with a plurality of sponsorship level switches 481a, with each switch 481a respective to a slider 454a.

Permit sponsorship selection button 480a can be implemented in a toggle or on/off fashion, whereby if toggled "on" then switches 481a become interactive and if toggled "off" then switches 481a become non-interactive (perhaps disappearing altogether or becoming "greyed"). In a present embodiment, switches 481a have three settings: N which represents "no" sponsorship; "P" which represents "partial" sponsorship; and "F" which represents "full" sponsorship. No sponsorship means that no sponsorship is used to subsidize the service; partial sponsorship means that the service is partially subsidized, while full sponsorship means that the service is fully subsidized. A partially subsidized service could refer to, for example, in the context of VoIP, the playing of an audio advertisement prior to the connection of a voice call. As another example of a partially subsidized service, a video streaming service could be paused at periodic intervals for the playing of one or more video sponsorship messages. At the completion of the video sponsorship message(s), the video streaming service would resume. A fully subsidized service could refer to, for example, in the context of Gaming, the streaming of a banner across the screen 420 during entire playing of any particular game. Note in the example shown in FIG. 9, that switches 481a-1, 481a-2, and 481a-5 are set to "N" for no sponsorship, while the remaining switches 481a are set to "P" for partial sponsorship. Note that since switches 481a-1, 481a-2, and 481a-5 are set to "N", and that those same switches 481a-1, 481a-2, and 481a-5 relate to basic package portion 470a, that basic package portion 470a is unchanged from basic package portion 470. However, since switches 481a-3, 481a-4, 481a-6, and 481a-7 are set to "P", and that those switches 481a-3, 481a-4, 481a-6 and 481a-7 relate to enhanced package portion 474a, that enhanced package portion 474a has been reduced in half in relation to enhanced package portion 474. Those skilled in the art will recognize that switches 481a can be manifested via alternative controls (for example, sliders) that provide for a finer degree of granularity in terms of defining the level of sponsorship for a particular service.

It should be understood that the foregoing teachings can be combined with the teachings of Applicant's co-pending U.S. patent application Ser. No. 11/744,588 entitled "SYSTEM AND METHOD FOR PROVIDING CONTEXT BASED SERVICES" filed May 4, 2007.

Further variations, combinations and subsets of the foregoing embodiments will now occur to those skilled in the art.

The novel teachings herein can provide certain advantages. For example, where elements in system are produced by different vendors or have been deployed using separate specifications, configurator 122 can be deployed so as to automatically accommodate such differences to facilitate efficient deployments of different traffic plans. The teachings herein can satisfy this need.

All documents referenced are incorporated herein by reference.

The invention claimed is:

1. A communication system comprising:
at least one element for interconnecting a client device and a server for hosting a service; said element for implementing a traffic plan; said traffic plan for regulating access of said service by said client device;
a configurator connected to said element and to a subscriber terminal associated with said client device; said configurator adapted to:
receive inputs from said subscriber terminal representing a proposed version of said traffic plan;
generate a representation of said proposed version of said traffic plan, for display on said subscriber terminal;
continue receiving said inputs and generating said representation based on variations of said proposed version until an indication is received from said subscriber terminal that said traffic plan is accepted, and thereupon generate said traffic plan and automatically deploy said traffic plan amongst said at least one element.

2. The communication system of claim 1 wherein said at least one element includes one or more of a GPRS Gateway Service Node (GGSN), a Policy Charging Rules Function (PCRF), a Subscription Profile Repository (SPR) and an Online Charging Server (OCS).

3. The communication system of claim 1 wherein said at least one element include one or more of a Mobile Switching Center (MSC), Call Session Control Function (CSCF), Service Capability Interaction Manager (SCIM), Application Server (AS), Multimedia Messaging Service Center (MMS-C), Wireless Application Protocol (WAP) Gateway, Short Message Service Center (SMS-C), Unified Messaging Server, and content distribution servers.

4. The communication system of claim 2 wherein traffic plan includes said policy aspects that are respective to said PCRF and said SPR.

5. The communication system of claim 2 wherein said traffic plan includes charging aspects that are respective to said OCS.

6. The communication system of claim 1 wherein said service is one of software downloads, web-pages, instant messaging, email, web-mail, mapping services, location applications, social networking services and applications, file sharing services and applications, peer-to-peer services, music or video streams or downloads.

7. The communication system of claim 1 wherein said elements are configured to connect said client device to a plurality of different servers hosting different services and said traffic plan is for regulating access of each of said services by said client device.

8. The communication system of claim 7 wherein said services include at least one of software downloads, web-pages, instant messaging, email, web-mail, mapping services, location applications, social networking services and applications, file sharing services and applications, peer-to-peer services, music or video streams or downloads.

9. A configurator in accordance with claim 1.

10. A method for configuring a communication system comprising:
at a configurator, receiving, from a subscriber terminal, inputs representing a proposed version of a traffic plan at a configurator, said traffic plan for regulating access of a service by a client device associated with said subscriber terminal;
at said configurator, generating a representation of said proposed version of said traffic plan based on said inputs, for display on said subscriber terminal;
at said configurator, repeating the receipt of inputs and the generation of said representation based on variations of said proposed version until an indication is received from said subscriber terminal that said traffic plan is accepted and thereupon, generating said traffic plan and automatically deploying said traffic plan from said configurator amongst at least one element adapted to interconnect said client device with a server hosting said service and to implement said traffic plan.

11. The method according to claim 10 wherein one of said traffic plan comprises policy aspects and a charging aspects.

12. The method according to claim 11 wherein said elements include one or more of a GPRS Gateway Service Node (GGSN), Service Capability Interaction Manager (SCIM), a Policy Charging Rules Function (PCRF), a Subscription Profile Repository (SPR) and an Online Charging System (OCS).

13. The method of claim 10 wherein said elements include one or more of a Mobile Switching Center (MSC), Call Session Control Function (CSCF), Application Server (AS), Multimedia Messaging Service Center (MMS-C), Wireless Application Protocol (WAP) Gateway, Short Message Service Center (SMS-C), Unified Messaging Server, and content distribution servers.

14. The method according to claim 12 wherein said policy aspects are respective to said PCRF and said SPR.

15. The method according to claim 12 wherein said charging aspects are respective to said OCS.

16. The method according to claim 10 wherein said service is one of software downloads, web-pages, instant messaging, email, web-mail, mapping services, location applications, social networking services and applications, file sharing services and applications, peer-to-peer services, music or video streams or downloads.

17. The method according to claim 10 wherein said elements are configured to connect said client device to a plurality of different servers hosting different services and said traffic plan is for regulating access of each of said services by said client device.

18. The method according to claim 17 wherein said services include at least one of software downloads, web-pages, instant messaging, email, web-mail, mapping services, location applications, social networking services and applications, file sharing services and applications, peer-to-peer services, music or video streams or downloads.

19. The method according to claim 10 wherein said inputs are received via a graphical user interface, said graphical user interface comprising input values respective to different types of services.

20. The method according to claim 19 wherein said representation is generated on said graphical user interface to indicate a total price for said proposed version of said traffic plan based on said inputs.

21. The method according to claim 19 wherein said inputs are provided using at least one of sliders, switches and radio boxes.

22. The method of claim 19 wherein said input values represent at least one of maximum volume and quality of service for each of said types of services.

23. The method of claim 19 wherein said maximum volume is respective to a given period of time.

24. The method of claim 19 wherein said different types of services include a first class of services and a second class of services.

25. The method of claim 24 wherein said first class of services is basic services and said second class of services is enhanced services.

26. The method of claim 24 wherein said representation is generated on said graphical user interface and indicates a total price for a traffic plan based on said inputs and further indicates which portion of said price is associated with said first class of services and which portion of said price is associated with said second class of services.

27. The method of claim 19 wherein said input values include a representation of whether to send an alert as to whether a maximum volume has been reached under said traffic plan.

28. The method according to claim 10 wherein said inputs include said at least one service.

\* \* \* \* \*